United States Patent
Chen et al.

(10) Patent No.: US 10,452,214 B2
(45) Date of Patent: Oct. 22, 2019

(54) SINGLE TYPE TOUCH PANEL STRUCTURE AND MANUFACTURING METHOD OF THE SAME

(71) Applicants: Interface Technology (ChengDu) Co., Ltd., Sichuan (CN); Interface Optoelectronics (ShenZhen) Co., Ltd., Shenzhen (CN); General Interface Solution Limited, Miaoli County (TW)

(72) Inventors: Chun-Ming Chen, Guangdong (CN); Ping-Yang Chen, Guangdong (CN); Ying-Chieh Chiang, Guangdong (CN); Tzu-Hsiang Lin, Guangdong (CN); Chun-Ta Chen, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 184 days.

(21) Appl. No.: 15/627,435

(22) Filed: Jun. 19, 2017

(65) Prior Publication Data
US 2018/0232077 A1    Aug. 16, 2018

(30) Foreign Application Priority Data
Feb. 16, 2017 (CN) .......................... 2017 1 0084701

(51) Int. Cl.
G06F 3/044 (2006.01)

(52) U.S. Cl.
CPC .... *G06F 3/044* (2013.01); *G06F 2203/04103* (2013.01)

(58) Field of Classification Search
CPC ....................... G06F 3/044; G06F 2203/04103
See application file for complete search history.

(56) References Cited

U.S. PATENT DOCUMENTS

2011/0143077 A1*  6/2011  Kakihara .................. H01B 1/22
                                                    428/67
2014/0246225 A1*  9/2014  Mizuno .................... G06F 3/044
                                                    174/255
2015/0144255 A1*  5/2015  Peng ........................ B32B 15/00
                                                    156/182

* cited by examiner

Primary Examiner — Robert J Michaud
(74) Attorney, Agent, or Firm — CKC & Partners Co., LLC

(57) ABSTRACT

A manufacturing method of a single type touch panel structure includes steps as follows. A transparent metal oxide layer is configured on a substrate. The transparent metal oxide layer is patterned to form a first electrode pattern on the substrate. A transferable transparent conductive film is thermally laminated onto the first electrode pattern so that a photo sensitive layer is sandwiched between the transparent metal oxide layer and a transparent conductive coating layer. The transferable transparent conductive film is patterned for mutually forming a second electrode pattern on the transparent conductive coating layer and one surface of the photo sensitive layer adjoining the transparent conductive coating layer.

11 Claims, 13 Drawing Sheets

A-A

SINGLE TYPE TOUCH PANEL STRUCTURE AND MANUFACTURING METHOD OF THE SAME

This application claims priority to China Application Serial Number 201710084701.1, filed Feb. 16, 2017, which is herein incorporated by reference.

BACKGROUND

Field of Disclosure

The present disclosure relates to a touch panel structure and manufacturing method of the same. More particularly, the present disclosure relates to a single type touch panel structure and manufacturing method of the same.

Description of Related Art

Recently, a conventional single type (e.g., one glass solution, OGS) of touch panel technology refers to a touch panel having two different axial sensing layers (i.e., touch sensor) directly formed on a substrate thereof and an insulation layer interposed between the axial sensing layers to be a dielectric to allow coupling capacitances generated between the axial sensing layers. Thus, when a touch occurs on the touch panel by a touching object, the existing distribution of the coupling capacitance of the touch position is changed by the touching object so that the touch position by the touching object can be detected by sensing the change of the coupling capacitance.

However, the axial sensing layers formed on the substrate in the recent industries must be performed in a plurality of manufacturing procedures (e.g., film-coating process) for sequentially forming the axial sensing layers on the substrate. Thus, these manufacturing procedures are quite complicated, and the preparations of materials are also quite diverse. Accordingly, the overall manufacturing of the touch panel is difficult, and the cost thereof is not easy to reduce, and the yield cannot be effectively improved.

SUMMARY

An aspect of the disclosure is to provide a single type touch panel structure and manufacturing method of the same, which can simplify and accelerate the manufacturing procedures thereof, and increase the yield.

According to one embodiment, the manufacturing method of a single type touch panel structure includes steps as follows. A transparent metal oxide layer is configured on a substrate. The transparent metal oxide layer is patterned to form a first electrode pattern on the substrate. A transferable transparent conductive film is thermally laminated onto the first electrode pattern so that a photo sensitive layer of the transferable transparent conductive film is sandwiched between the transparent metal oxide layer and a transparent conductive coating layer of the transferable transparent conductive film. The transferable transparent conductive film is patterned for mutually forming a second electrode pattern on the transparent conductive coating layer and one surface of the photo sensitive layer adjoining the transparent conductive coating layer.

Therefore, since at least one of the axial sensing electrode layers is formed by using the transferable transparent conductive film in the manufacturing method of the aforementioned embodiment, not only the manufacturing procedures of the touch panel can be simplified, but also the complication and difficulty of the manufacturing procedures can be decreased, so as to further reduce the manufacturing cost and increase the yield.

In one or more embodiments of the present disclosure, the step of patterning the transferable transparent conductive film for mutually forming the second electrode pattern on the transparent conductive coating layer and the one surface of the photo sensitive layer adjoining the transparent conductive coating layer further includes steps as follows. One surface of the transparent conductive coating layer opposite to the photo sensitive layer is exposed and developed so that the same area of the transparent conductive coating layer and the one surface of the photo sensitive layer is partially removed.

In one or more embodiments of the present disclosure, the step of forming the transparent metal oxide layer on the substrate further includes steps as follows. Another transferable transparent conductive film having another transparent conductive coating layer and another photo sensitive layer is thermally laminated onto one surface of the substrate so that the another photo sensitive layer is sandwiched between the one surface of the substrate and the another transparent conductive coating layer.

In one or more embodiments of the present disclosure, the step of patterning the transparent metal oxide layer to form a first electrode pattern on the substrate further includes steps as follows. The another transferable transparent conductive film is exposed and developed so that the same area of the another transparent conductive coating layer and the one surface of the another photo sensitive layer is partially removed.

In one or more embodiments of the present disclosure, the step of forming the transparent metal oxide layer on the substrate further includes a metal-oxide-semiconductor film is formed on one surface of the substrate.

According to one embodiment, the single type touch panel structure includes a substrate, a photo sensitive conductive film and a transparent metal oxide layer. The photo sensitive conductive film includes a photo sensitive layer and a sensing electrode layer in which one surface of the photo sensitive layer is partially provided with a protrusive portion, and the protrusive portion and the sensing electrode layer are identical in pattern, and the sensing electrode layer is only located at one surface of the protrusive portion opposite to the photo sensitive layer, and fully covering the one surface of the protrusive portion. The transparent metal oxide layer is sandwiched between the substrate and the photo sensitive layer, and the transparent metal oxide layer comprises another sensing electrode layer.

Therefore, since at least the sensing electrode layer is formed by using the transferable transparent conductive film in the single type touch panel structure of the aforementioned embodiment, the bending function of the single type touch panel structure can be improved for passing a rigorous bending test. Furthermore, since the transferable transparent conductive film is quite thin, the overall thickness of the touch panel structure can be effectively reduced so as to be advantageous to achieve light weighting products.

In one or more embodiments of the present disclosure, the transparent metal oxide layer is another photo sensitive conductive film having another photo sensitive layer sandwiched between the sensing electrode layer and the another sensing electrode layer. One surface of the another photo sensitive layer is partially provided with another protrusive portion, and the another protrusive portion and the another sensing electrode layer are identical in pattern, and the another sensing electrode layer is only located at one surface of the another protrusive portion opposite to the another photo sensitive layer, and fully covers the one surface of the another protrusive portion.

In one or more embodiments of the present disclosure, a spacing layer is formed between the photo sensitive layer and the remaining area of the one surface of the another photo sensitive layer provided without the another protrusive portion.

In one or more embodiments of the present disclosure, a minimum linear distance of a gap defined between the photo sensitive layer and the remaining area of the one surface of the another photo sensitive layer provided without the another protrusive portion is between 0-1 μm.

In one or more embodiments of the present disclosure, the sensing electrode layer includes nano metal wires.

In one or more embodiments of the present disclosure, the transparent metal oxide layer is a metal-oxide-semiconductor film directly sandwiched between the substrate and the photo sensitive layer.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
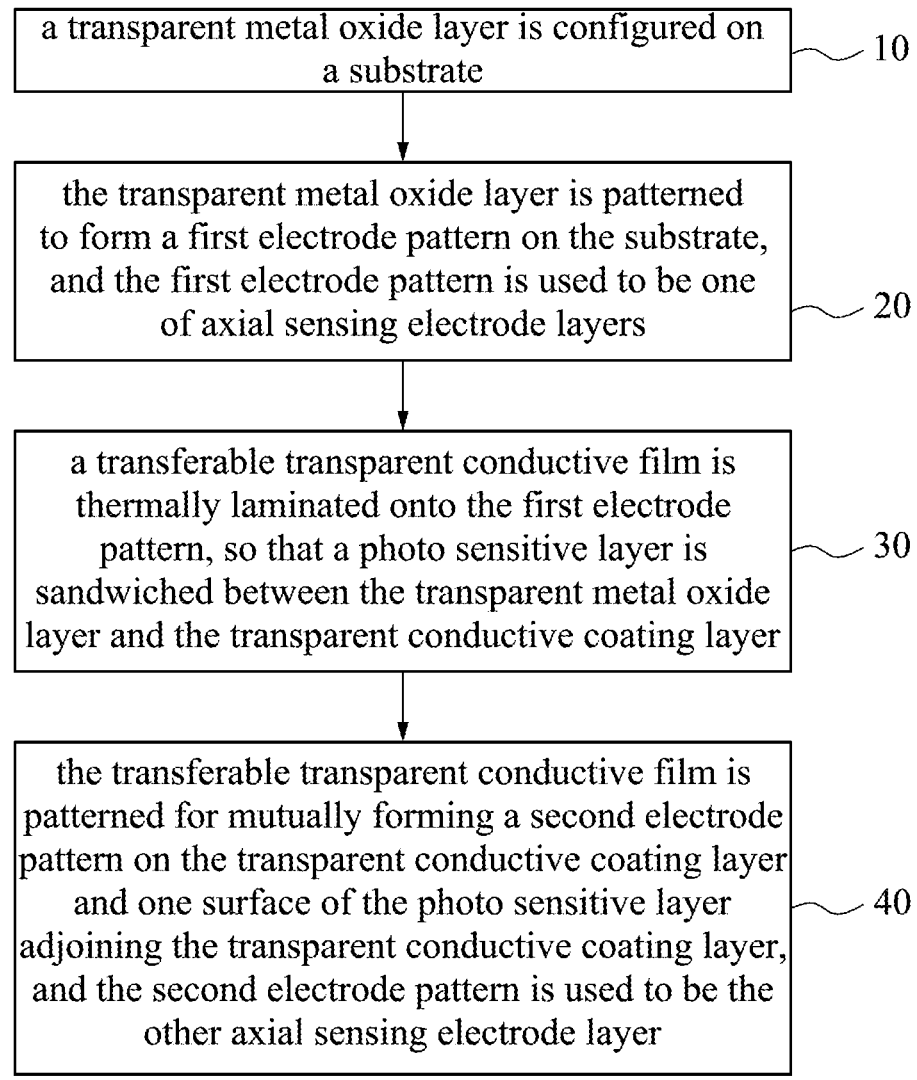
FIG. 1 is a flow chart of a manufacturing method of a single type touch panel structure according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Reference is now made to FIG. 1, in which FIG. 1 is a flow chart of a manufacturing method of a single type touch panel structure according to one embodiment of the disclosure. As shown in FIG. 1, in the embodiment, the manufacturing method 10 of a single type touch panel structure includes the following step 10-step 40. In step 10, a transparent metal oxide layer is configured on a substrate. In step 20, the transparent metal oxide layer is patterned to form a first electrode pattern on the substrate, and the first electrode pattern is used to be one of axial sensing electrode layers. In step 30, a transferable transparent conductive film (e.g., transparent conductive transfer film, TCTF) is thermally laminated onto the first electrode pattern, the transferable transparent conductive film includes a transparent conductive coating layer and a photo sensitive layer sandwiched between the transparent metal oxide layer and the transparent conductive coating layer. In step 40, the transferable transparent conductive film is patterned for mutually forming a second electrode pattern on the transparent conductive coating layer and one surface of the photo sensitive layer adjoining the transparent conductive coating layer, and the second electrode pattern is used to be the other axial sensing electrode layer.

Thus, when using the transferable transparent conductive film for producing the axial sensing electrode layers, the manufacturing method only needs to transfer the transferable transparent conductive film on the substrate and complete a patterning process by exposure and development steps. The manufacturing method does not need to perform additional steps of coating and etching for removing film. Thus, since at least one of the axial sensing electrode layers is formed by using the transferable transparent conductive film in the manufacturing method of the aforementioned embodiment, not only the manufacturing procedures of the touch panel can be simplified, but also the complication and difficulty of the manufacturing procedures can be decreased, so as to further reduce the manufacturing cost and increase the yield.

Figure 2:
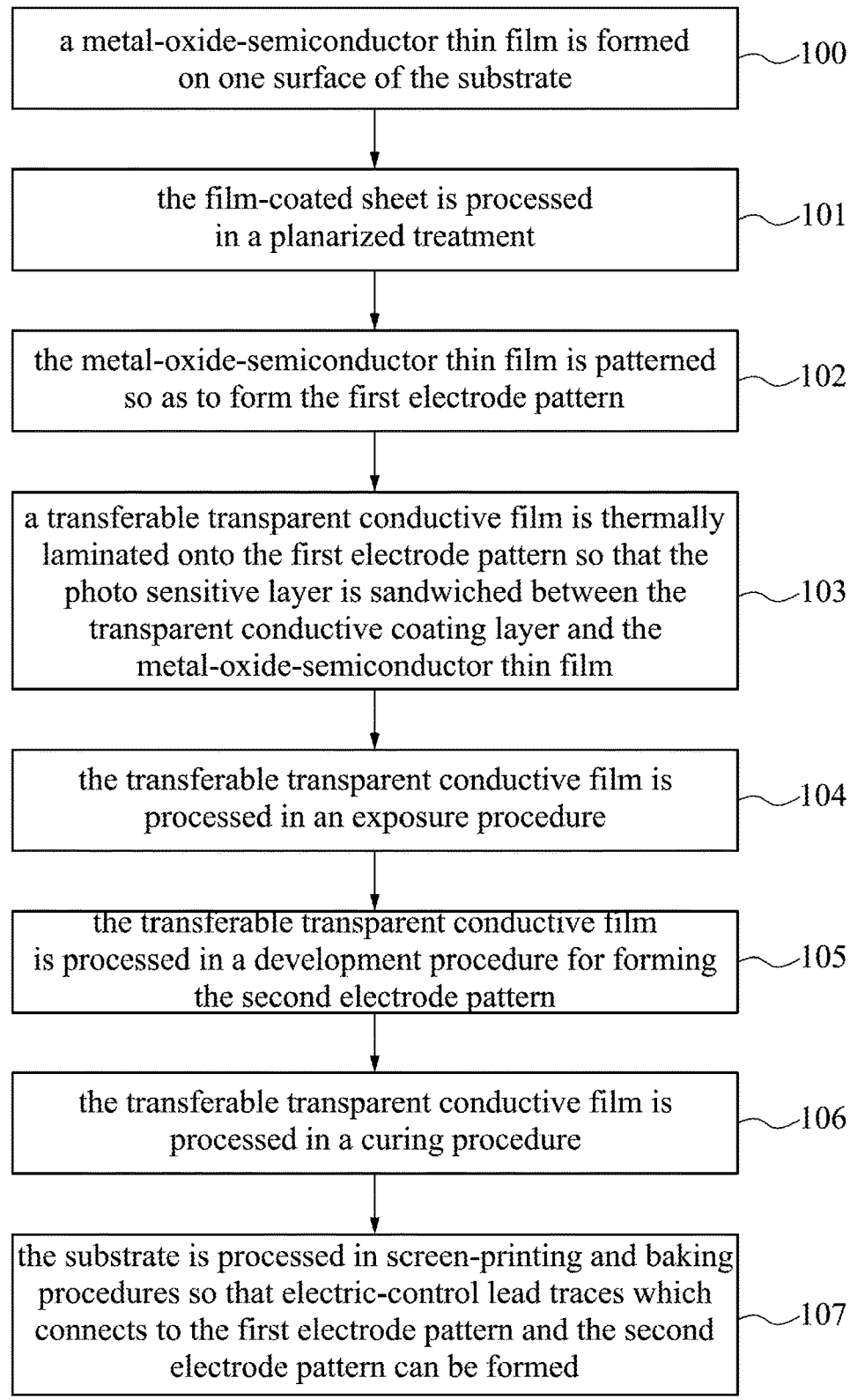
FIG. 2 is a detailed flow chart of a manufacturing method of a single type touch panel structure according to one embodiment of the disclosure.
Figure 3A:
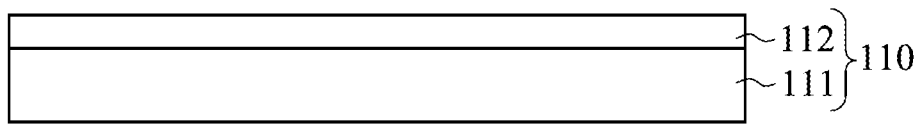
FIG. 3A-FIG. 3I are operational schematic views of FIG. 2.
Figure 3B:
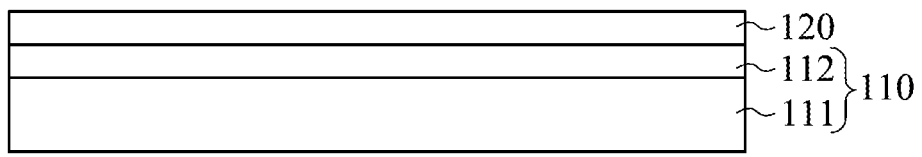
Figure 3C:
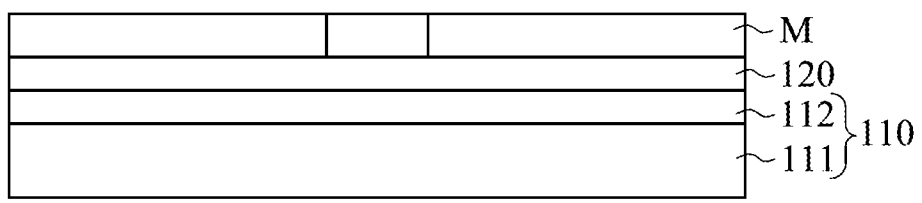

The above-mentioned transparent metal oxide layer may be selected, for example, as a metal-oxide-semiconductor thin film in this embodiment, as described above in connection with one of the above-described manufacturing method. Reference is now made to FIG. 2 and FIG. 3A to FIG. 3I in which FIG. 2 is a detailed flow chart of a manufacturing method of a single type touch panel structure according to one embodiment of the disclosure, FIG. 3A-FIG. 3I are operational schematic views of FIG. 2. As shown in FIG. 2, the manufacturing method of a single type touch panel structure includes step 100 to step 107 as outlined below. In step 100, a metal-oxide-semiconductor thin film is formed on one surface of the substrate. For example, as shown in FIG. 3A, a metal-oxide-semiconductor thin film 112 is coated on one surface of the substrate 111 for collectively forming a film-coated sheet 110. The metal-oxide-semiconductor thin film 112 includes indium tin oxide (ITO), however, the disclosure is not limited to types of the metal-oxide-semiconductor thin film. In step 101, the film-coated sheet is processed in a planarized treatment. For example, the film-coated sheet 110 is processed in an aging treatment. By baking the film-coated sheet 110 at high temperature, the molecules of the metal-oxide-semiconductor thin film 112 disposed on the surface of the substrate 111 can be more uniformed so that the surface texture of the metal-oxide-semiconductor thin film 112 can be planarized. In step 102, the metal-oxide-semiconductor thin film is patterned so as to form the first electrode pattern. In detail, as shown in FIG. 3B and FIG. 3C, a dry film photoresist 120 is attached on the film-coated sheet 110; next, a photomask M is moved to cover the dry film photoresist 120 disposed above the film-coated sheet 110 so as to process an exposure procedure to the dry film photoresist 120; next, the film-coated sheet 110 is processed in a development treatment and an etching treatment for removing the film so as to form a first electrode pattern on the metal-oxide-semiconductor thin film 112. However, since the patterning process for patterning the metal oxide semiconductor thin film has been known as a prior art, it will not be further described.

Figure 3D:
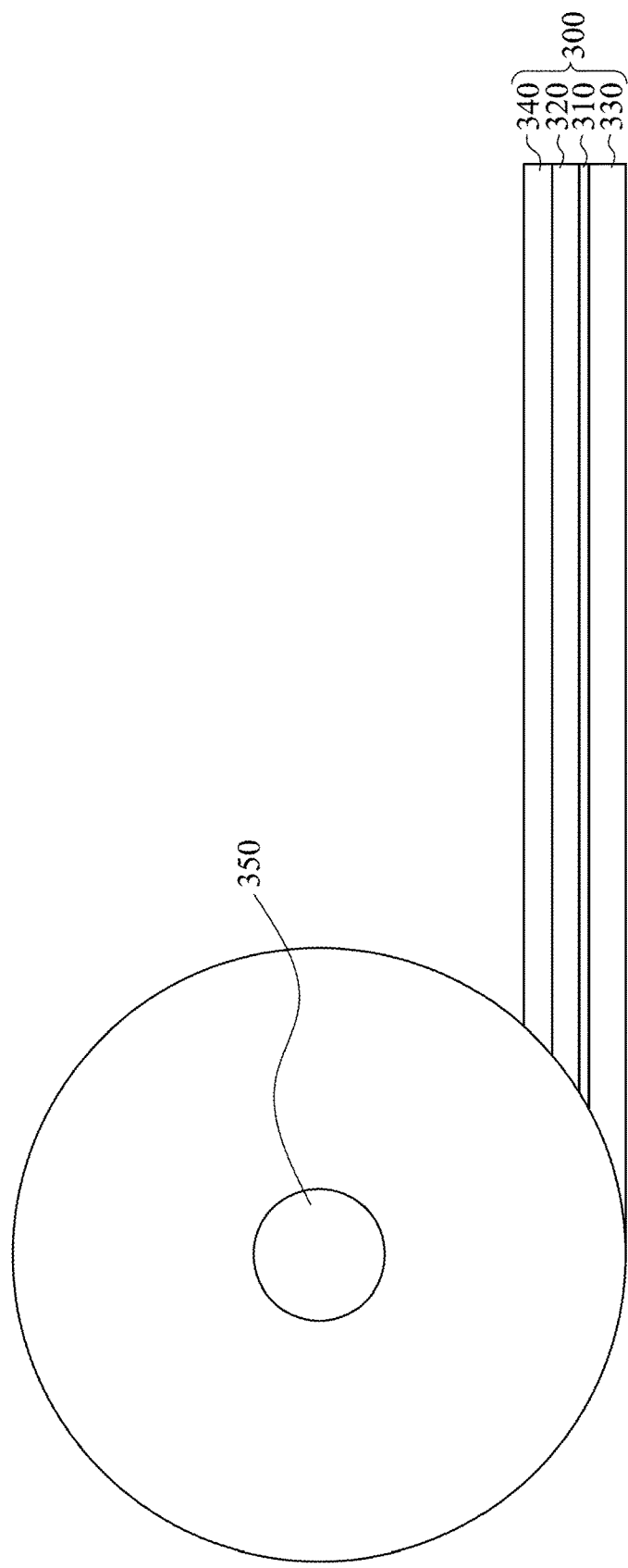
Figure 3E:
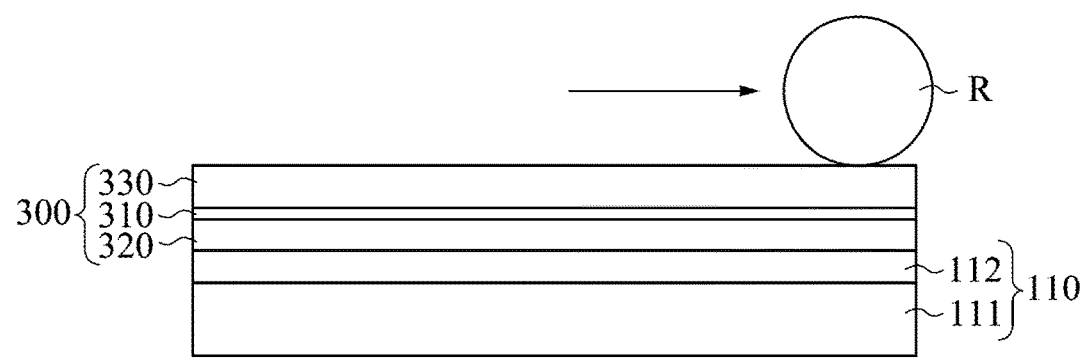

In step 103, a transferable transparent conductive film is thermally laminated onto the first electrode pattern so that the photo sensitive layer is sandwiched between the transparent conductive coating layer and the metal-oxide-semiconductor thin film. Specifically, as shown in FIG. 3D, For collection of the transferable transparent conductive film 300, the product of the transferable transparent conductive film 300 can be selected to be wound around a shaft 350. However, the disclosure is not limited thereto, the transferable transparent conductive film also can be cut into pieces which are stacked one another. The product of the transferable transparent conductive film 300 includes a transparent conductive coating layer 310, a photo sensitive layer 320, a carrier layer 330 and a protective layer 340, which are stacked one another and with the same areas in which the transparent conductive coating layer 310 is sandwiched between the photo sensitive layer 320 and the carrier layer 330, and the photo sensitive layer 320 is sandwiched between the transparent conductive coating layer 310 and the protective layer 340. Thus, as shown in FIG. 3E, after the protective layer 340 is removed from the transferable transparent conductive film 300, the transferable transparent conductive film 300 without the protective layer 340 can be pulled and moved through a row-to-row movement for covering one surface of the film-coated sheet 110 having the first electrode layer (i.e., metal-oxide-semiconductor thin film 112). Thereafter, through a thermos-compressing method in low temperature (e.g., 100° C. to 140° C.), the transferable transparent conductive film 300 without the protective layer 340 can be pressed by a pressing roller R to be transferred onto the surface of the film-coated sheet 110 having the first electrode layer (i.e., metal-oxide-semiconductor thin film 112). At this moment, the photo sensitive layer 320 is sandwiched between the transparent conductive coating layer 310 and the first electrode layer (i.e., metal-oxide-semiconductor thin film 112).

Figure 3F:
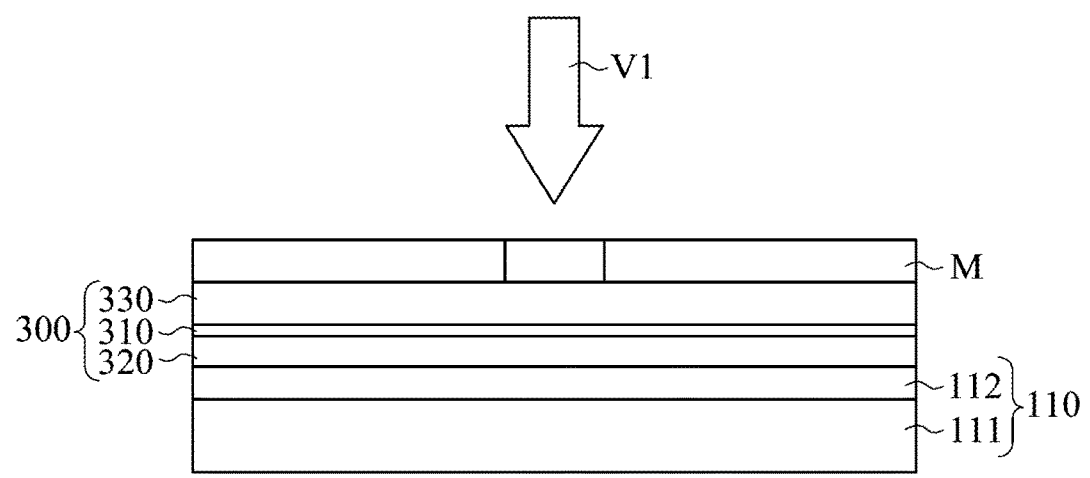

In step 104, the transferable transparent conductive film is processed in an exposure procedure. For example, as shown in FIG. 3F, after the transferable transparent conductive film 300 is transferred on the film-coated sheet 110, the carrier layer 330 of the transferable transparent conductive film 300 is covered by the photomask M, and the carrier layer 330 of the transferable transparent conductive film 300 and the photomask M are irradiated by ultraviolet lights V1 so that the ultraviolet lights V1 can pass through the carrier layer 330 to irradiate the transparent conductive coating layer 310 and the photo sensitive layer 320 through the photomask M. However, the disclosure is not limited to other conventional exposure technologies.

Figure 3G:
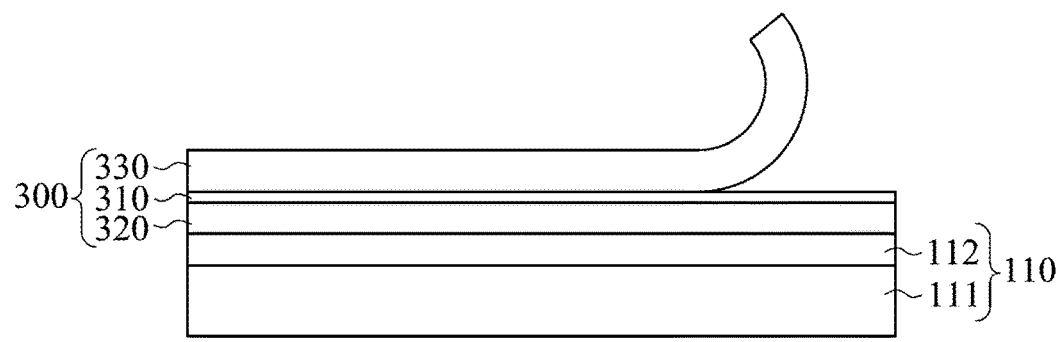
Figure 3H:
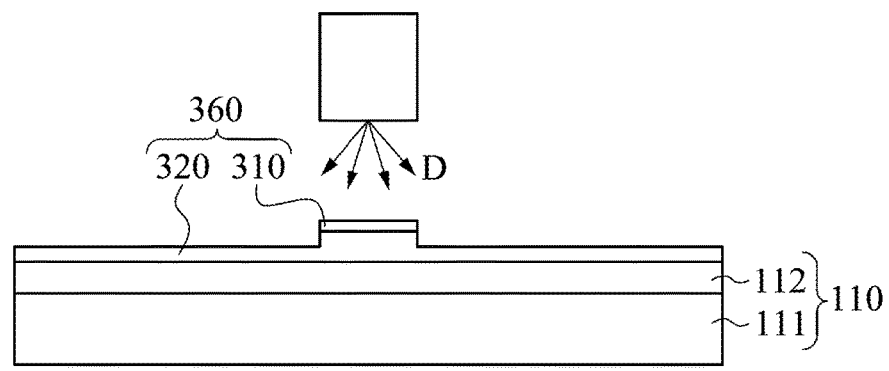

In step 105, the transferable transparent conductive film is processed in a development procedure for forming the aforementioned second electrode pattern. For example, as shown in FIG. 3G, after the transferable transparent conductive film 300 is exposed in the exposure procedure, the carrier layer 330 is removed first; next, as shown in FIG. 3H, the transparent conductive coating layer 310 and the photo sensitive layer 320 of the transferable transparent conductive film 300 are processed in an alkaline development treatment through a developing agent D (e.g., Na2CO3 solution). Therefore, after the same areas of the transparent conductive coating layer 310 and the photo sensitive layer 320 are partially removed, the aforementioned second electrode pattern is mutually formed on the transparent conductive coating layer 310 and one surface of the photo sensitive layer 320 adjoining the transparent conductive coating layer 310. However, the disclosure is not limited to other conventional development technologies.

Figure 3I:
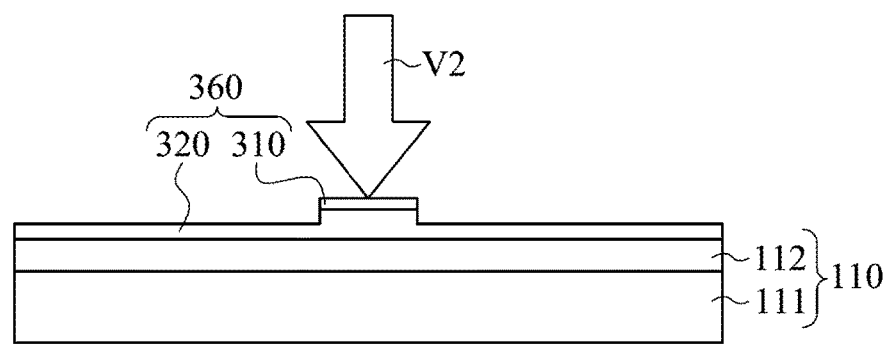

In step 106, the transferable transparent conductive film is processed in a curing procedure. For example, as shown in FIG. 3I, the transparent conductive coating layer 310 and the photo sensitive layer 320 of the transferable transparent conductive film 300 are irradiated by ultraviolet lights V2 so that the photo sensitive layer 320 is completely cured or stiffened for tightly bonding the second electrode pattern (i.e., transparent conductive coating layer 310) together. Thus, the second electrode pattern (i.e., transparent conductive coating layer 310) and the photo sensitive layer 320 are collectively formed to be a photo sensitive conductive film 360.

In step 107, the substrate is processed in screen-printing and baking procedures so that electric-control lead traces (e.g., silver-paste leading wires) can be formed on the substrate in which the electric-control lead traces are capable of connecting to the first electrode pattern and the second electrode pattern so as to preliminarily complete the single type touch panel structure of the embodiment.

It is noted, although the transferable transparent conductive film is adopted to be one axial sensing electrode layer in the embodiment only, the overall thickness of the single type touch panel structure made in the present embodiment still can be improved to 28 μm.

Figure 4:
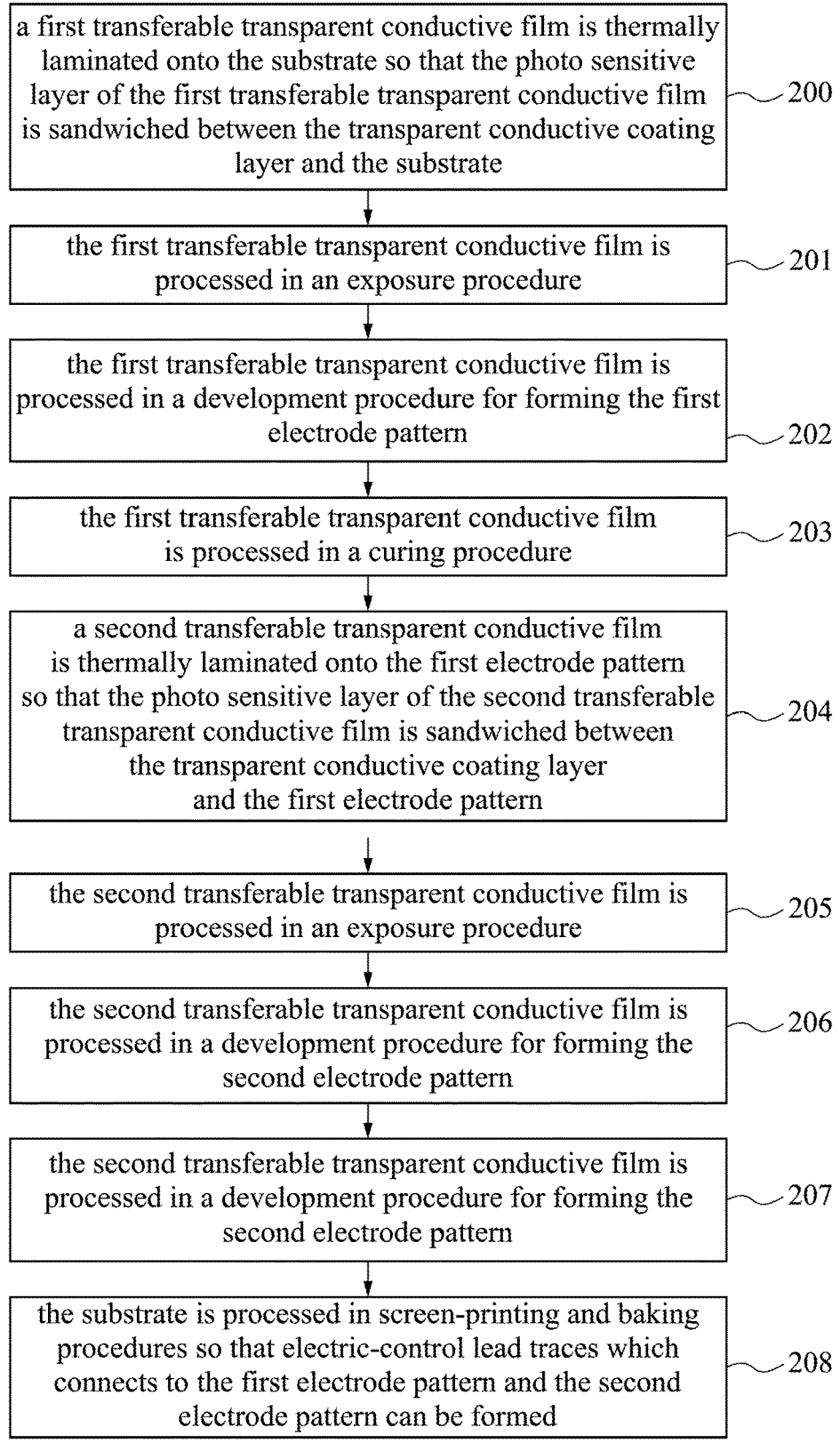
FIG. 4 is a detailed flow chart of a manufacturing method of a single type touch panel structure according to one embodiment of the disclosure.
Figure 5A:
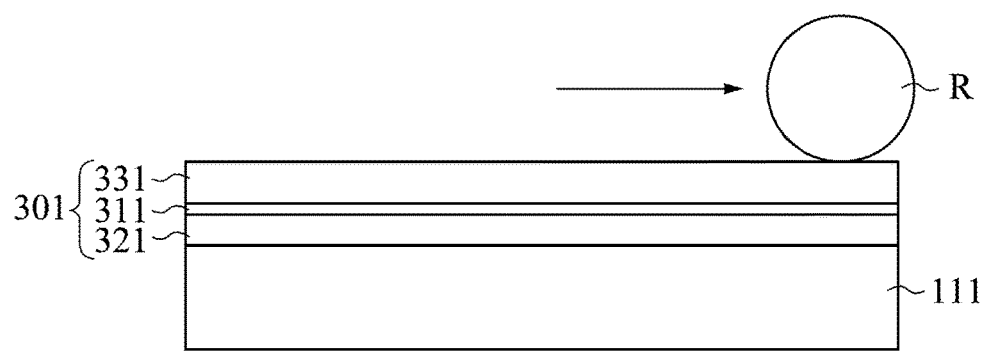
FIG. 5A-FIG. 5J are operational schematic views of FIG. 4.

Another embodiment of the aforementioned manufacturing method provided is here described in detail. The forgoing transparent metal oxide layer for example can be another transferable transparent conductive film in the embodiment so that both of the different axial sensing layers can be formed by using the transferable transparent conductive films. Reference is now made to FIG. 4 and FIG. 5A to FIG. 5J in which FIG. 4 is a detailed flow chart of a manufacturing method of a single type touch panel structure according to one embodiment of the disclosure, and FIG. 5A-FIG. 5J are operational schematic views of FIG. 4. As shown in FIG. 4 and FIG. 5A, the manufacturing method of the single type touch panel structure includes the following step 200-step 209.

In step 200, as shown in FIG. 5A, a first transferable transparent conductive film 301 is thermally laminated onto the substrate 111 so that the photo sensitive layer 321 of the first transferable transparent conductive film 301 is sandwiched between the transparent conductive coating layer 311 and the substrate 111. Specifically, after the protective layer (refer to FIG. 3A) is removed, the first transferable transparent conductive film 301 is moved to cover one surface of the substrate 111, thereafter, through a thermos-compressing method in low temperature (e.g., 100° C. to 140° C.), the first transferable transparent conductive film 301 can be pressed by a pressing roller R to be transferred onto the surface of the substrate 111. At this moment, the photo sensitive layer 321 is sandwiched between the transparent conductive coating layer 311 and the substrate 111.

Figure 5B:
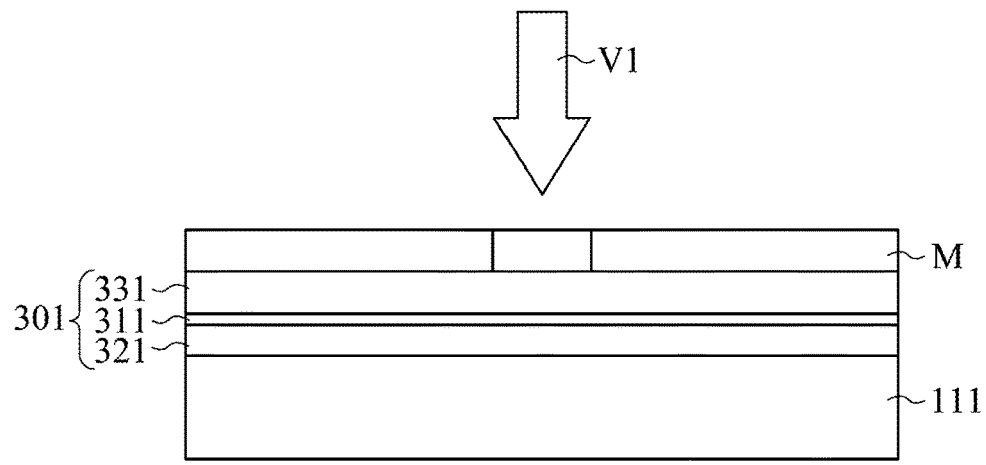

In step 201, as shown in FIG. 5A, the first transferable transparent conductive film is processed in an exposure procedure. For example, after the first transferable transparent conductive film 301 is transferred onto the substrate 111, as shown in FIG. 5B, the photomask M is moved to cover the carrier layer 331 of the first transferable transparent conductive film 301, and the carrier layer 331 and the photomask M are irradiated by ultraviolet lights V1 so that the ultraviolet lights V1 can pass through the carrier layer 331 to irradiate the transparent conductive coating layer 311 and the photo sensitive layer 321 through the photomask M. However, the disclosure is not limited to other conventional exposure technologies.

Figure 5C:
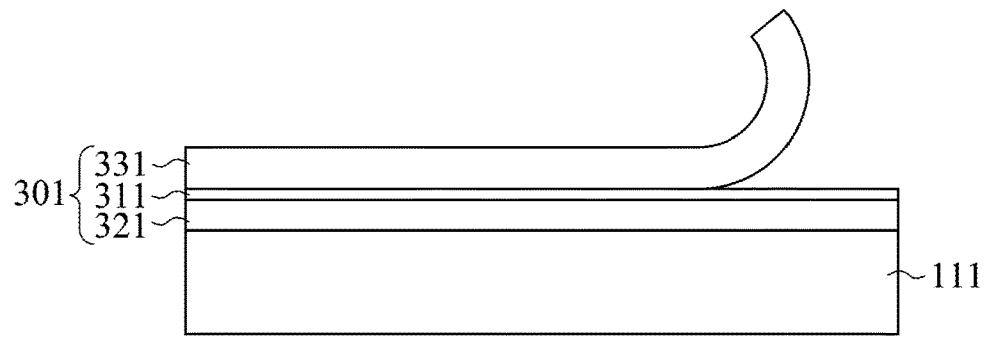
Figure 5D:
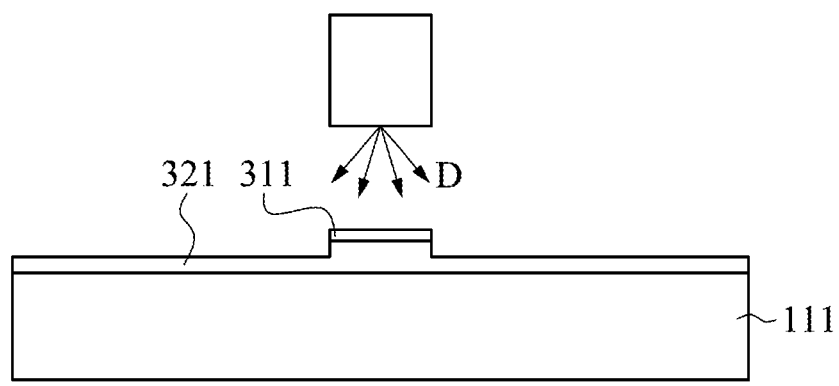

In step 202, the first transferable transparent conductive film is processed in a development procedure for forming the aforementioned first electrode pattern. For example, as shown in FIG. 5C, after the first transferable transparent conductive film 301 is exposed in the exposure procedure, the carrier layer 331 is removed first; next, as shown in FIG. 5D, the photo sensitive layer 321 and the transparent conductive coating layer 311 of the first transferable transparent conductive film 301 are processed in an alkaline development treatment through a developing agent D (e.g., Na2CO3 solution). Therefore, after the same areas of the transparent conductive coating layer 311 and the photo sensitive layer 321 are partially removed, the aforementioned first electrode pattern is mutually formed on the transparent conductive coating layer 311 and one surface of the photo sensitive layer 321 adjoining the transparent conductive coating layer 311. However, the disclosure is not limited to other conventional development technologies.

Figure 5E:
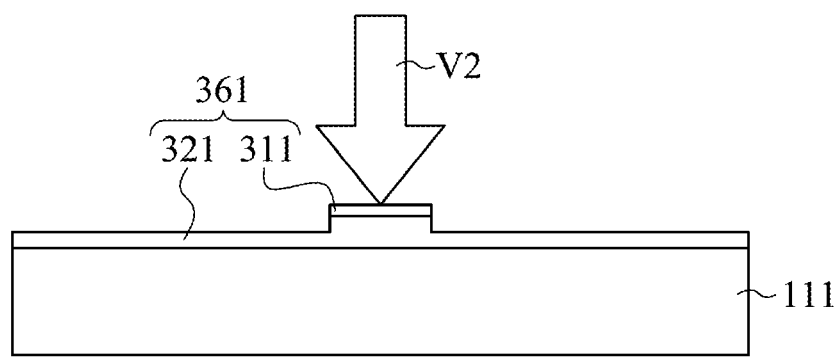

In step 203, the first transferable transparent conductive film is processed in a curing procedure. For example, as shown in FIG. 5E, the transparent conductive coating layer 311 and the photo sensitive layer 321 of the first transferable transparent conductive film 301 are irradiated by ultraviolet lights V2 so that the photo sensitive layer 321 is completely cured or stiffened for tightly bonding the first electrode pattern (i.e., transparent conductive coating layer 311) together. Thus, the first electrode pattern (i.e., transparent conductive coating layer 311) and the photo sensitive layer 321 are collectively formed to be a first photo sensitive conductive film 361.

Figure 5F:
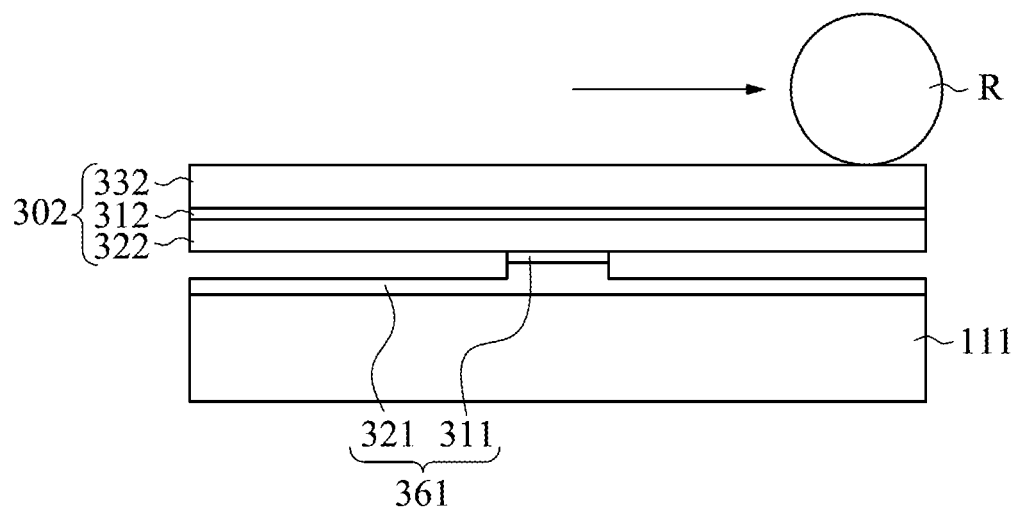

In step 204, as shown in FIG. 5F, a second transferable transparent conductive film 302 is thermally laminated onto the first electrode pattern (i.e., transparent conductive coating layer 311) of the first photo sensitive conductive film 361 so that the photo sensitive layer 322 of the second transferable transparent conductive film 302 is sandwiched between the transparent conductive coating layer 312 and the first electrode pattern (i.e., transparent conductive coating layer 311). Specifically, after the protective layer (refer to FIG. 3A) is removed, the second transferable transparent conductive film 302 is moved to cover the first photo sensitive conductive film 361, thereafter, through a thermos-compressing method in low temperature (e.g., 100° C. to 140° C.), the second transferable transparent conductive film 302 without the protective layer can be pressed by a pressing roller R to be transferred onto the first electrode pattern (i.e., transparent conductive coating layer 311). At this moment, the photo sensitive layer 322 is sandwiched between the transparent conductive coating layer 312 and the first electrode pattern (i.e., transparent conductive coating layer 311).

Figure 5G:
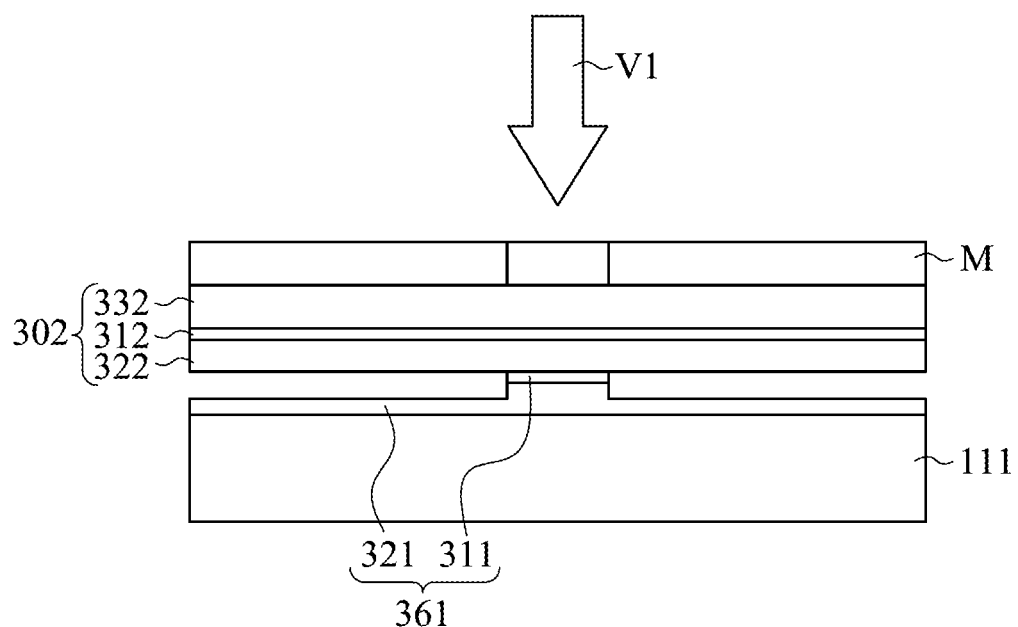

In step 205, the second transferable transparent conductive film is processed in an exposure procedure. For example, as shown in FIG. 5G, the photomask M is moved to cover the carrier layer 332 of the second transferable transparent conductive film 302, and the photomask M and the carrier layer 332 of the second transferable transparent conductive film 302 are irradiated by ultraviolet lights V1 so that the ultraviolet lights V1 can pass through the carrier layer 332 to irradiate the transparent conductive coating layer 312 and the photo sensitive layer 322 through the photomask M. However, the disclosure is not limited to other conventional exposure technologies.

Figure 5H:
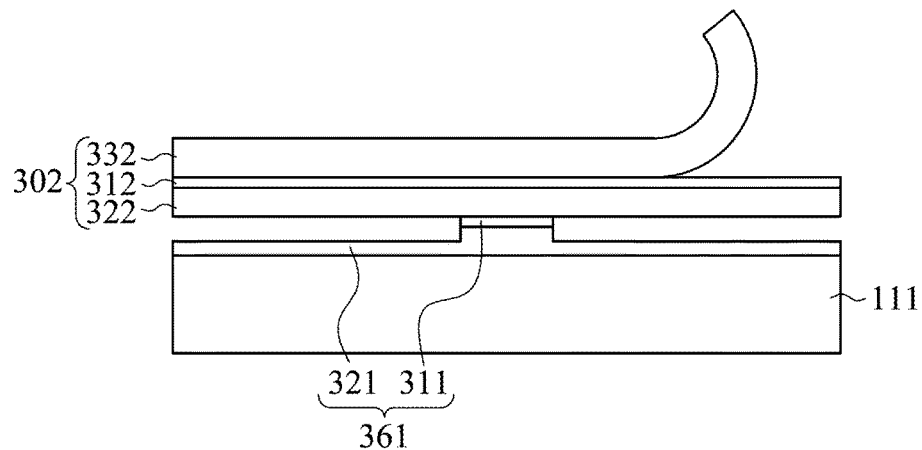
Figure 5I:
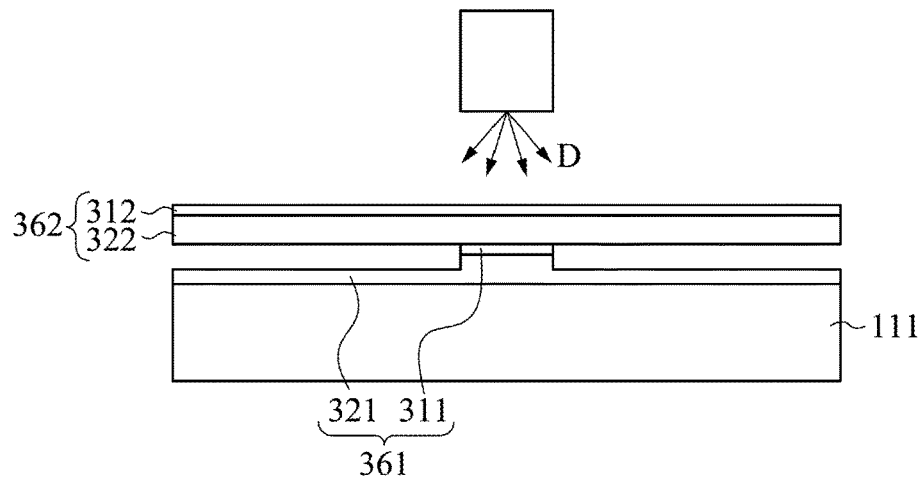

In step 206, the second transferable transparent conductive film is processed in a development procedure for forming the aforementioned second electrode pattern. For example, as shown in FIG. 5H and FIG. 5I, after the carrier layer 332 is removed, the transparent conductive coating layer 312 and the photo sensitive layer 322 of the second transferable transparent conductive film 302 are processed in an alkaline development treatment through a developing agent D (e.g., Na2CO3 solution). Lately, after the same areas of the transparent conductive coating layer 312 and the photo sensitive layer 322 are partially removed, the aforementioned second electrode pattern is mutually formed on the transparent conductive coating layer 312 and one surface of the photo sensitive layer 322 adjoining the transparent conductive coating layer 312. However, the disclosure is not limited to other conventional development technologies.

Figure 5J:
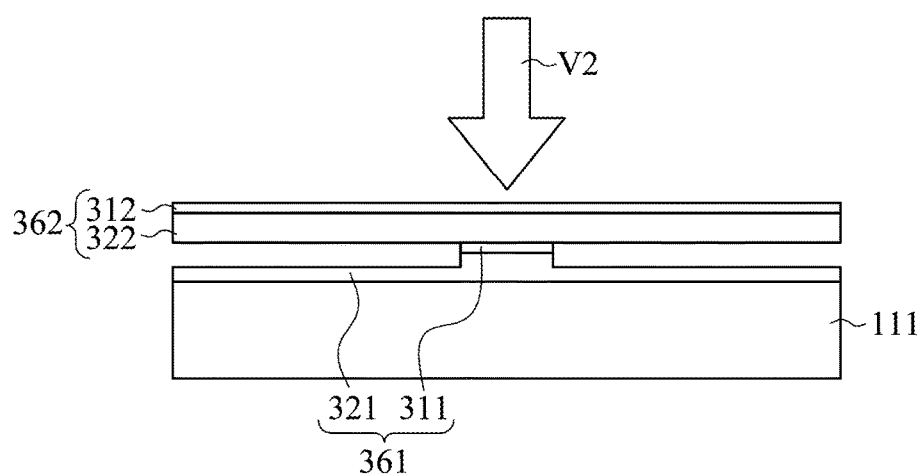

In step 207, the second transferable transparent conductive film is processed in a curing procedure. For example, as shown in FIG. 5J, the transparent conductive coating layer 312 and the photo sensitive layer 322 of the second transferable transparent conductive film 302 are irradiated by ultraviolet lights V2 so that the photo sensitive layer 322 is completely cured or stiffened for tightly bonding the second electrode pattern (i.e., transparent conductive coating layer 312) together. Thus, the second electrode pattern (i.e., transparent conductive coating layer 312) and the photo sensitive layer 322 are collectively formed to be a second photo sensitive conductive film 362.

In step 208, the substrate is processed in screen-printing and baking procedures so that electric-control lead traces (e.g., silver-paste leading wires) can be formed on the substrate in which the electric-control lead traces are capable of connecting to the first electrode pattern and the second electrode pattern so as to preliminarily complete the single type touch panel structure of the embodiment.

It is noted, the first and second transferable transparent conductive films are adopted to be the different axial sensing electrode layers in the embodiment, thus, the overall thickness of the single type touch panel structure made in the present embodiment can be improved to 10 μm.

Figure 6:
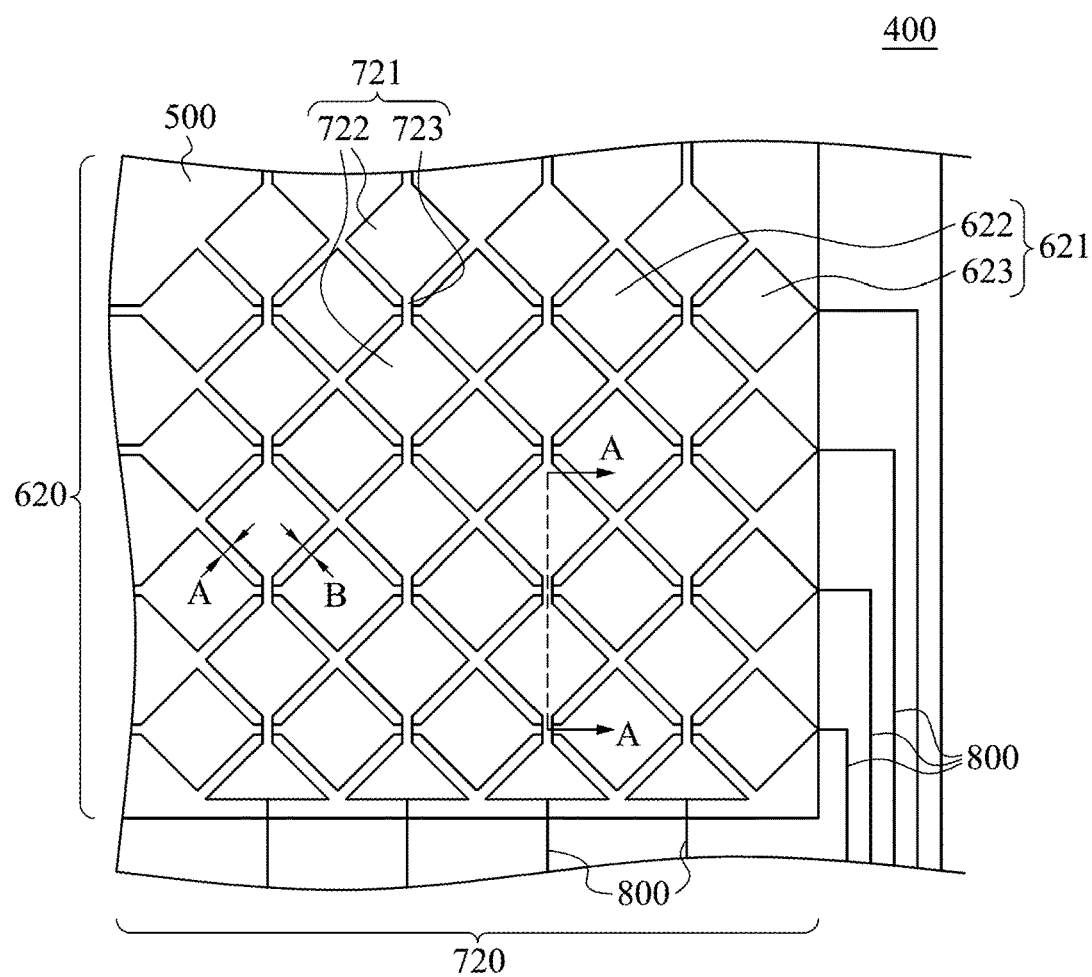
FIG. 6 is a partial schematic view of a single type touch panel structure according to one embodiment of the disclosure.
Figure 7:
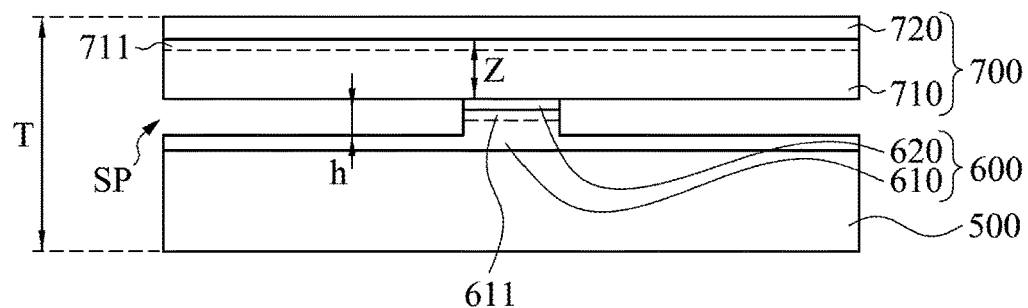
FIG. 7 is a cross sectional view of FIG. 6 taken along A-A.

Reference is now made to FIG. 6 and FIG. 7 in which FIG. 6 is a partial schematic view of a single type touch panel structure 400 according to one embodiment of the disclosure, and FIG. 7 is a cross sectional view of FIG. 6 taken along A-A. As shown in FIG. 6 and FIG. 7, the single type touch panel structure 400 includes a substrate 500, a first photo sensitive conductive film 600 and a second photo sensitive conductive film 700 in which he first photo sensitive conductive film 600 and the second photo sensitive conductive film 700 are respectively flexible, and the substrate 500, the first photo sensitive conductive film 600 and the second photo sensitive conductive film 700 are stacked in sequence, that is, the first photo sensitive conductive film 600 is sandwiched between the second photo sensitive conductive film 700 and the substrate 500. The substrate 500, the first photo sensitive conductive film 600 and the second photo sensitive conductive film 700 are completely located at three different planar levels, respectively.

Thus, in the single type touch panel structure 400 of the embodiment, since the first photo sensitive conductive film 600 and the second photo sensitive conductive film 700 are respectively made by the aforementioned transferable transparent conductive films (e.g., transparent conductive transfer film, TCTF), thus, unlike the conventional sensing electrode layer made by transparent conductive oxide material, the first photo sensitive conductive film 600 and the second photo sensitive conductive film 700 not only increase the bendable function of the single type touch panel structure 400, but also will not lower the conductivity performance of the first photo sensitive conductive film 600 and the second photo sensitive conductive film 700 while the first photo sensitive conductive film 600 and the second photo sensitive conductive film 700 are stretched. Furthermore, since the transferable transparent conductive film is quite thin, the overall thickness of the touch panel structure can be effectively reduced (e.g., the overall thickness T in FIG. 7 is not greater than 50 μm) so as to be advantageous to achieve light weighting products.

Figure 8:
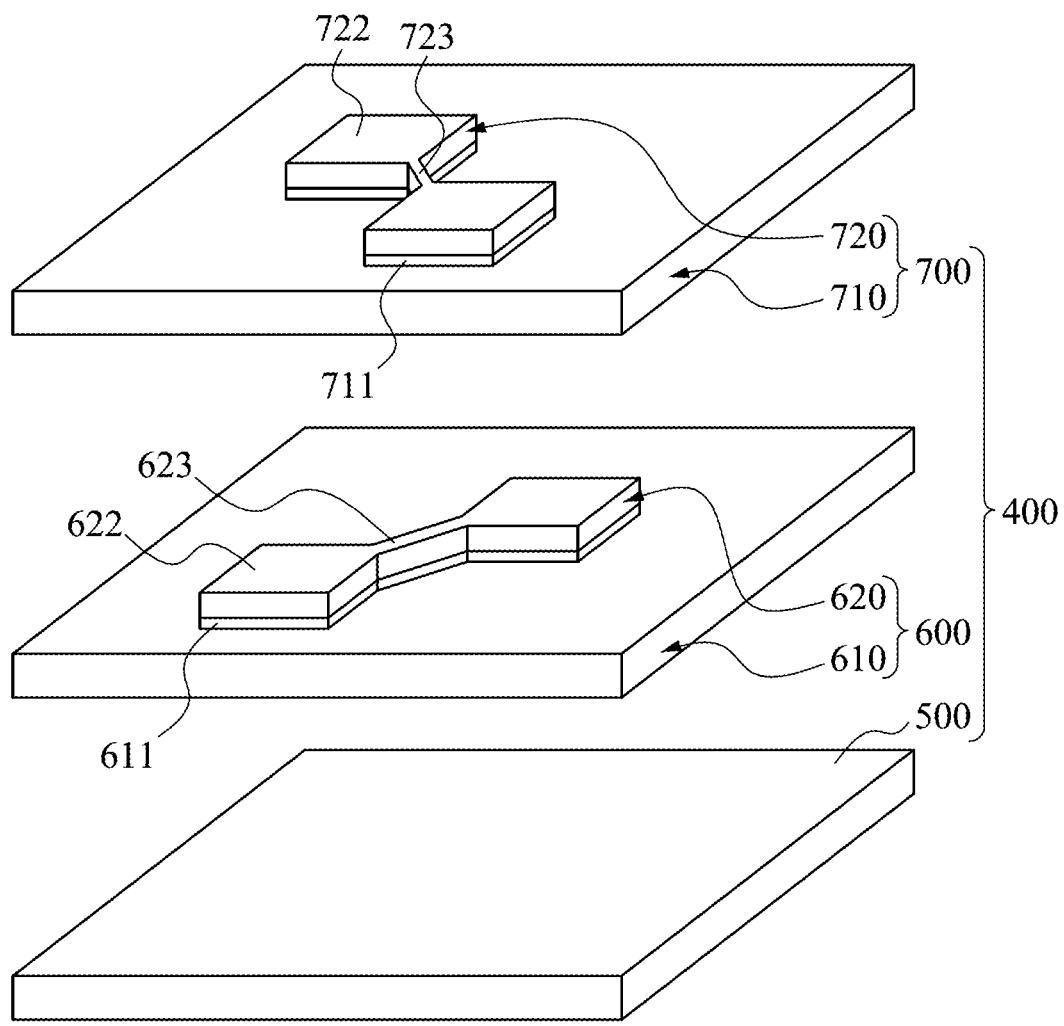
FIG. 8 is a partial exploded view of FIG. 5 according to one embodiment of the disclosure.

More particular, FIG. 8 is a partial exploded view of FIG. 5 according to one embodiment of the disclosure. As shown in FIG. 8, the first photo sensitive conductive film 600 includes a first photo sensitive layer 610 and a first sensing electrode layer 620. One surface of the first photo sensitive layer 610 opposite to the substrate 500 is partially provided with a first protrusive portion 611. The first sensing electrode layer 620 and the first protrusive portion 611 are the identical in pattern, and the first sensing electrode layer 620 is only located at one surface of the first protrusive portion 611 opposite to the first photo sensitive layer 610, and fully covers the surface of the first protrusive portion 611. The first photo sensitive layer 610 is made of insulation material, and the first photo sensitive layer 610 is stacked between the first sensing electrode layer 620 and the substrate 500. The first sensing electrode layer 620 includes a plurality of the first nano metal wires (not shown in figures).

The second photo sensitive conductive film 700 includes a second photo sensitive layer 710 and a second sensing electrode layer 720. One surface of the second photo sensitive layer 710 opposite to the first photo sensitive conductive film 600 is partially provided with a second protrusive portion 711. The second sensing electrode layer 720 and the second protrusive portion 711 are the identical in pattern, and the second sensing electrode layer 720 is only located at one surface of the second protrusive portion 711 opposite to the second photo sensitive layer 710, and fully covers the surface of the second protrusive portion 711.

Since the second photo sensitive layer 710 is made of insulation material, and the second photo sensitive layer 710 is stacked between the first sensing electrode layer 620 and the second sensing electrode layer 720, the first sensing electrode layer 620 and the second sensing electrode layer 720 are electrically insulated with each other. The first sensing electrode layer 620 and the second sensing electrode layer 720 are completely not coplanar, and the pattern of the first sensing electrode layer 620 and the pattern of the second sensing electrode layer 720 are different. Therefore, no insulation layer is needed to be additionally interposed between the first sensing electrode layer 620 and the second sensing electrode layer 720. A minimum linear distance between the first sensing electrode layer 620 and the second sensing electrode layer 720, that is, a total height Z from the second photo sensitive layer 710 to the second protrusive portion 711 is in 1 μm to 20 μm, for example. The second sensing electrode layer 720 includes a plurality of the second nano metal wires (not shown in figures). The first nano metal wires and the second nano metal wires respectively are silver nanowires (AgNW), however, the disclosure is not limited thereto.

Also, refer to FIG. 7, a spacing layer SP is formed between the second photo sensitive layer 710 and the remaining area of the surface of the first photo sensitive layer 610 which is provided without the first protrusive portion 611, and the spacing layer SP is directly formed between the first photo sensitive layer 610 and the second photo sensitive layer 710. On the other word, a gap h is defined between the first photo sensitive layer 610 and the remaining area of the surface of the first photo sensitive layer 610 which is provided without the first protrusive portion 611, and a minimum linear distance of the gap h is between 0-1 μm, for example, however, the disclosure is not limited thereto.

As shown in FIG. 6, the first sensing electrode layer 620 includes a plurality of first axial sensing electrode strings 621 which are arranged abreast one another along an X axis. Each of the first axial sensing electrode strings 621 includes a plurality of first electrodes 622 and first connection portions 623 in which each of the first connection portions 623 is connected to any two neighboring ones of the first sensing electrodes 622. The second sensing electrode layer 720 includes a plurality of second axial sensing electrode strings 721 which are arranged abreast one another along an Y axis. Each of the second axial sensing electrode strings 721 includes a plurality of second electrodes 722 and second connection portions 723 in which each of the second connection portions 723 is connected to any two neighboring ones of the second sensing electrodes 722.

Thus, in the embodiment, since the first sensing electrode layer 620 and the second sensing electrode layer 720 are completely not coplanar, all of the first electrodes 622 and all of the second electrodes 722 can be respectively disposed on different heights. Therefore, the single type touch panel structure 400 in the embodiment not only does not need to adopt bridge wires for connecting the first/second electrodes 622, 722, but also is able to increase the number of the first electrodes 722 and the second electrodes 722, and the installation areas for arranging the first electrodes 622 and the second electrodes 722, thereby improving the sensing accuracy of touch-point detection.

Moreover, the single type touch panel structure 400 in the embodiment further includes a plurality of electric-control lead traces 800. The electric-control lead traces 800 are formed on the substrate 500, and are respectively electrically connected to the first sensing electrode layer 620 and the second sensing electrode layer 720.

Since the first sensing electrode layer 620 and the second sensing electrode layer 720 are processed through the exposure and development procedures individually, thus, unlike the different axial sensing electrode layers being collectively processed through the same exposure and development procedure, the first sensing electrode layer 620 and the second sensing electrode layer 720 provide higher sensing accuracy of location detection. For example, as shown in FIG. 6, when a pitch A is defined between one of the second electrodes 722 and one of the first electrodes 622 disposed on the left side of said second electrode 722, a pitch B is defined between said second electrodes 722 and another of the first electrodes 622 disposed on the right side of said second electrode 722, the pitch A and pitch B meet the following relationship:

$$2 \text{ μm} \leq |A-B| \leq 300 \text{ μm}$$

The material of the substrate 500 can be a soft or hard insulating material, or high transmittance insulating material. For example, the substrate 500 includes glass, polycarbonate (PC), polyethylene terephthalate (PET), Polymethyl methacrylate (PMMA) or cyclic olefin copolymer (COC), however, the disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A manufacturing method of a single type touch panel structure, comprising:
    configuring a transparent metal oxide layer on a substrate;
    patterning the transparent metal oxide layer to form a first electrode pattern on the substrate;
    thermally laminating a transferable transparent conductive film having a transparent conductive coating layer and a photo sensitive layer onto the first electrode pattern so that the photo sensitive layer is sandwiched between the transparent metal oxide layer and the transparent conductive coating layer; and
    patterning the transferable transparent conductive film for mutually forming a second electrode pattern on the transparent conductive coating layer and one surface of the photo sensitive layer adjoining the transparent conductive coating layer.

2. The manufacturing method of the single type touch panel structure of claim 1, wherein the step of patterning the transferable transparent conductive film for mutually forming the second electrode pattern on the transparent conductive coating layer and the one surface of the photo sensitive layer adjoining the transparent conductive coating layer, further comprises:
    exposing and developing one surface of the transparent conductive coating layer opposite to the photo sensitive layer so that the same area of the transparent conductive coating layer and the one surface of the photo sensitive layer is partially removed.

3. The manufacturing method of the single type touch panel structure of claim 1, wherein the step of forming the transparent metal oxide layer on the substrate, comprises:
    thermally laminating another transferable transparent conductive film having another transparent conductive coating layer and another photo sensitive layer onto one surface of the substrate so that the another photo sensitive layer is sandwiched between the one surface of the substrate and the another transparent conductive coating layer.

4. The manufacturing method of the single type touch panel structure of claim 3, wherein the step of patterning the transparent metal oxide layer to form a first electrode pattern on the substrate, further comprising:
    exposing and developing the another transferable transparent conductive film so that the same area of the another transparent conductive coating layer and the one surface of the another photo sensitive layer is partially removed.

5. The manufacturing method of the single type touch panel structure of claim 1, wherein the step of forming the transparent metal oxide layer on the substrate, comprises:
    forming a metal-oxide-semiconductor film on one surface of the substrate.

6. A single type touch panel structure, comprising:
    a substrate;
    a photo sensitive conductive film comprising a photo sensitive layer and a sensing electrode layer, wherein one surface of the photo sensitive layer is partially provided with a protrusive portion, and the protrusive portion and the sensing electrode layer are identical in pattern, and the sensing electrode layer is only located at one surface of the protrusive portion opposite to the photo sensitive layer, and fully covers on the one surface of the protrusive portion; and
    a transparent metal oxide layer sandwiched between the substrate and the photo sensitive layer, and the transparent metal oxide layer comprising another sensing electrode layer.

7. The single type touch panel structure of claim 6, wherein the transparent metal oxide layer is another photo sensitive conductive film having another photo sensitive layer sandwiched between the sensing electrode layer and the another sensing electrode layer,
    one surface of the another photo sensitive layer is partially provided with another protrusive portion, and the another protrusive portion and the another sensing electrode layer are identical in pattern, and the another sensing electrode layer is only located at one surface of the another protrusive portion opposite to the another photo sensitive layer, and fully covers on the one surface of the another protrusive portion.

8. The single type touch panel structure of claim 7, wherein a spacing layer is formed between the photo sensitive layer and the remaining area of the one surface of the another photo sensitive layer provided without the another protrusive portion.

9. The single type touch panel structure of claim 7, wherein a minimum linear distance of a gap defined between the photo sensitive layer and the remaining area of the one surface of the another photo sensitive layer provided without the another protrusive portion is between 0-1 µm.

10. The single type touch panel structure of claim 6, wherein the sensing electrode layer comprises nano metal wires.

11. The single type touch panel structure of claim 6, wherein the transparent metal oxide layer is a metal-oxide-semiconductor film directly sandwiched between the substrate and the photo sensitive layer.

* * * * *